(12) United States Patent
Lee et al.

(10) Patent No.: US 8,781,012 B2
(45) Date of Patent: Jul. 15, 2014

(54) METHOD OF TRANSMITTING CODEBOOK INDEX IN WIRELESS COMMUNICATION SYSTEM

(75) Inventors: Wook Bong Lee, Anyang-si (KR); Bin Chul Ihm, Anyang-si (KR); Moon Il Lee, Anyang-si (KR); Hyun Soo Ko, Anyang-si (KR)

(73) Assignee: LG Electronics Inc., Soul (KR)

( * ) Notice: Subject to any disclaimer, the term of this patent is extended or adjusted under 35 U.S.C. 154(b) by 374 days.

(21) Appl. No.: 12/448,599

(22) PCT Filed: Mar. 21, 2008

(86) PCT No.: PCT/KR2008/001626
§ 371 (c)(1),
(2), (4) Date: Jun. 26, 2009

(87) PCT Pub. No.: WO2008/115036
PCT Pub. Date: Sep. 25, 2008

(65) Prior Publication Data
US 2009/0323840 A1 Dec. 31, 2009

Related U.S. Application Data

(60) Provisional application No. 60/896,235, filed on Mar. 21, 2007.

(30) Foreign Application Priority Data

Jun. 25, 2007 (KR) .................. 10-2007-0062369
Oct. 16, 2007 (KR) .................. 10-2007-0104212

(51) Int. Cl.
*H04B 7/02* (2006.01)
*H04L 1/02* (2006.01)

(52) U.S. Cl.
USPC ........... 375/267; 375/259; 375/260; 455/132; 455/59

(58) Field of Classification Search
None
See application file for complete search history.

(56) References Cited

U.S. PATENT DOCUMENTS

| | | | |
|---|---|---|---|
| 2005/0157808 A1* | 7/2005 | Ihm et al. | 375/267 |
| 2006/0270360 A1* | 11/2006 | Han et al. | 455/69 |
| 2007/0049218 A1 | 3/2007 | Gorokhov et al. | |
| 2007/0105574 A1* | 5/2007 | Gupta et al. | 455/509 |
| 2008/0080634 A1* | 4/2008 | Kotecha et al. | 375/267 |
| 2008/0080635 A1* | 4/2008 | Hugl et al. | 375/267 |
| 2008/0316910 A1* | 12/2008 | Ashikhmin | 370/208 |
| 2011/0158335 A1* | 6/2011 | Lee et al. | 375/260 |
| 2012/0170675 A1* | 7/2012 | Li et al. | 375/267 |
| 2012/0314793 A1* | 12/2012 | Kang et al. | 375/267 |

FOREIGN PATENT DOCUMENTS

| | | | |
|---|---|---|---|
| EP | 1699145 A2 | 9/2006 | |
| WO | 2006049417 A1 | 5/2006 | |
| WO | WO 2006/049417 A1 | 5/2006 | |
| WO | 2006129958 A1 | 12/2006 | |
| WO | WO 2006/129958 A1 | 12/2006 | |

* cited by examiner

*Primary Examiner* — Shuwang Liu
*Assistant Examiner* — Gina McKie
(74) *Attorney, Agent, or Firm* — Mckenna Long & Aldridge LLP (57) ABSTRACT

A method of transmitting a codebook index in a wireless communication system includes receiving a feedback index regarding an entity selected from a plurality of entities belonging to a feedback codebook, selecting a precoder from a precoding codebook using the feedback index, the precoding codebook comprising a plurality of precoders and transmitting a precoder index of the selected precoder. Flexibility can be given to codebook designs, and overhead due to the feedback of codebook indices can be reduced.

8 Claims, 4 Drawing Sheets

METHOD OF TRANSMITTING CODEBOOK INDEX IN WIRELESS COMMUNICATION SYSTEM

This application claims priority to International Application No. PCT/KR2008/001626 filed on Mar. 21, 2008, which claims priority to U.S. Provisional Application No. 60/896,235 filed on Mar. 21, 2007, Korean Patent Application No. 10-2007-0062369 filed on Jun. 25, 2007 and Korean Patent Application No. 10-2007-0104212 filed on Oct. 16, 2007, all of which are incorporated by reference, as if fully set forth herein.

TECHNICAL FIELD

The present invention relates to wireless communications, and more particularly, to a method of transmitting a codebook index in a wireless communication system.

BACKGROUND ART

Wireless communication systems have developed into a high speed and high quality of radio packet communication systems in order to provide data service and multimedia service out of the initial voice-oriented service. In order to provide a high speed and high quality of data service in the wireless communication system, multiple-input multiple-output (MIMO) schemes have been proposed in various ways.

The MIMO schemes can be classified into spatial diversity scheme for increasing transmission reliability by employing multiple paths and spatial multiplexing scheme for improving the data rate by transmitting multiple data streams at the same time. Further, active research has recently been done on a method of obtaining the advantages of the two schemes by properly combining them.

The MIMO schemes can also be classified into open-loop transmission scheme in which channel information is used to schedule user data and closed-loop transmission scheme in which channel information is not used to schedule user data. In the open-loop transmission scheme, a transmitter and a receiver can be constructed relatively simply without uplink radio resources for transmitting channel information since the transmitter does not need channel information. However, the open-loop transmission scheme is disadvantageous in that its performance is degraded when channel correlation is increased or multiples channels are subject to deep fading at the same time because this scheme cannot cope with a channel change adaptively. On the other hand, in the closed-loop transmission scheme, a receiver estimates a channel and then re-transmits an estimated channel to a transmitter, and the transmitter acquires channel information. The transmitter performs pre-processing adapted to a channel in consideration of a channel state every moment, so the capacity of a system can be maximized.

In the closed-loop transmission scheme, system performance can be maximized when all channel information is known. But as channel information increases, radio resources for transmitting the channel information increase. Moreover, channel information for MIMO schemes increases as the number of antenna increases. If radio resource for channel information is allocated too much, radio resources for data may be insufficient. It may result in low data rate.

Thus, there is a need for method of maximizing the data rate while minimizing the amount of feedback information.

DISCLOSURE OF INVENTION

Technical Problem

A method of transmitting information on codebook in multiple antenna system is provided.

Technical Solution

In one aspect, a method of transmitting a codebook index in a wireless communication system is provided. The method includes receiving a feedback index regarding an entity selected from a plurality of entities belonging to a feedback codebook, selecting a precoder from a precoding codebook using the feedback index, the precoding codebook comprising a plurality of precoders and transmitting a precoder index of the selected precoder.

In another aspect, a method of transmitting a codebook index in a wireless communication system is provided. The method includes transmitting a feedback index selected from a feedback codebook and receiving a precoder index selected from a precoding codebook, wherein the number of bits representing the precoder index is larger than that of bits representing the feedback index.

In still another aspect, a method of transmitting a codebook index in a wireless communication system is provided. The method includes receiving a first feedback index from a first receiver, the first feedback index regarding an entity selected from a plurality of entities belonging to a feedback codebook, receiving a second feedback index from a second receiver, the second feedback index regarding an entity selected from the plurality of entities belonging to the feedback codebook and transmitting a first interference index to the first receiver, wherein the first interference index is the index of an entity of the feedback codebook, the entity acting on the first receiver as interference.

Advantageous Effects

A feedback codebook index is transmitted by disposing a feedback codebook separately from a precoding codebook. Accordingly, flexibility can be given to codebook designs, and overhead due to the feedback of codebook indices can be reduced.

MODE FOR THE INVENTION

Figure 1:
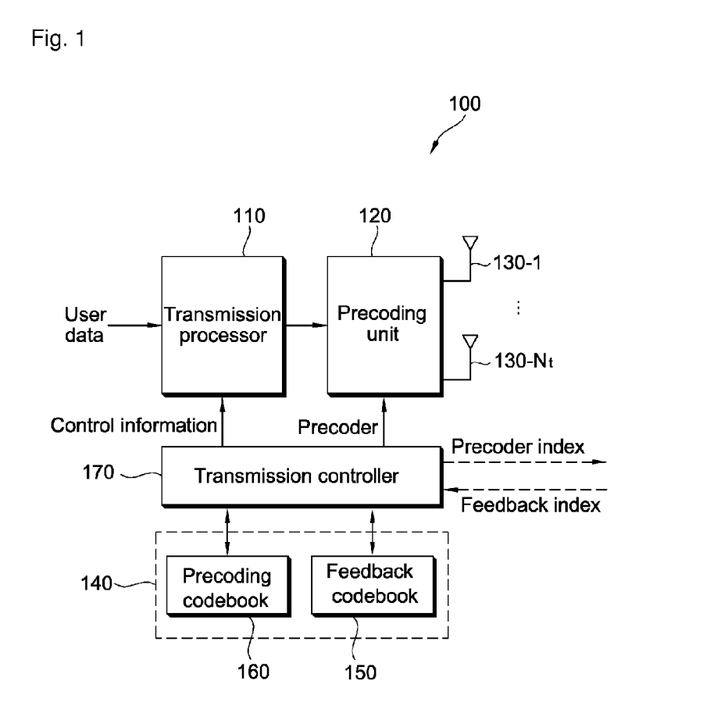
FIG. 1 is a block diagram showing a transmitter having multiple antennas in accordance with an embodiment of the present invention.

FIG. 1 is a block diagram showing a transmitter having multiple antennas in accordance with an embodiment of the present invention.

Referring to FIG. 1, a transmitter 100 includes a transmission processor 110, a preceding unit 120, transmission antennas 130-1, . . . , 130-Nt, a memory unit 140, a feedback codebook 150, a precoding codebook 160, and a transmission controller 170. The transmitter 100 can be a part of a base station (BS). The base station generally refers to a fixed station communicating with a user equipment and can be referred to as another terminology, such as node-B, a base transceiver system (BTS) or an access point.

The transmission processor 110 receives data from N users, produces K streams, which is transmitted at a time, encodes the K streams according to a predetermined coding method in order to form coded data, and maps the coded data to an input symbol u, which represents a location on a signal constellation.

The precoding unit 120 generates a transmission symbol x by performing preceding on the input symbol u. Precoding is a scheme of performing pre-processing on the input symbol u to be transmitted. If this precoding scheme is employed, a precoder (a vector or a matrix) is applied to the input symbol u to thereby generate the transmission symbol x. The precoding unit 120 may employ a variety of precoding methods, such as a dirty paper coding (DPC) method of arbitrarily canceling interference. The transmission symbol x is modulated and then transmitted through the transmission antennas 130-1, . . . , 130-Nt.

The memory unit 140 stores the feedback codebook 150 and the precoding codebook 160.

The feedback codebook 150 is a set of a plurality of entities. The plurality of entities is information, which is used to select a precoder by the transmission controller 170, and may become a vector or matrix. When the number of entities constituting the feedback codebook 150 is $N_F$, the number of bits necessary to represent the entire indices of the entities is $ceil(log_2 N_F)$, where ceil(a) denotes a minimum integer greater than a. The size, kind and generating algorithm of the entire entities belonging to the feedback codebook 150 are previously agreed between the transmitter 100 and a receiver (200 of FIG. 2). The feedback codebook 150 of the transmitter 100 is identical to a feedback codebook (240 of FIG. 2) of the receiver 200. Hence, the receiver 200 sends a feedback index to the transmitter 100, and the transmitter 100 can receive the feedback index and extracts an entity according to the feedback index. The feedback index is information to point to an entity belonging to the feedback codebook 150, and is information that is feedback from the receiver 200 to the transmitter. That is, the transmitter 100 and the receiver 200 can reduce the overhead of feedback information by exchanging a feedback index according to an entity belonging to the feedback codebook 150.

The precoding codebook 160 is a set of a plurality of precoders (matrices or vectors), which are used for precoding by the precoding unit 120. The size, kind and generating algorithm of the entire precoders belonging to the precoding codebook 160 are previously agreed between the transmitter 100 and the receiver 200. The precoding codebook 160 of the transmitter 100 is identical to a precoding codebook (250 of FIG. 2) of the receiver 200. Thus, the transmitter 100 and the receiver 200 can extract a selected precoder by exchanging only a precoder index. Here, the precoder index is information to indicate a precoder. The precoding codebook 160 may differ in size from the feedback codebook 150. In particular, the size of the feedback codebook 150 may be smaller than that of the precoding codebook 160. What the size of a codebook is small is meant that the number of entities belonging to the codebook is small. If the number of entities is small, the number of bits necessary for indices to represent the entities is small. Consequently, feedback overhead from a receiver to a transmitter can be decreased.

The transmission controller 170 receives a feedback index from the receiver 200 and extracts an entity according to the feedback index from the feedback codebook 150. The transmission controller 170 selects a proper precoder from the precoding codebook 160 by employing the extracted entity. An algorithm for selecting a precoder is described later on. The transmission controller 170 sends a selected precoder to the precoding unit 120. Further, the transmission controller 170 controls a precoder index with respect to the selected precoder to be sent to the receiver 200.

Figure 2:
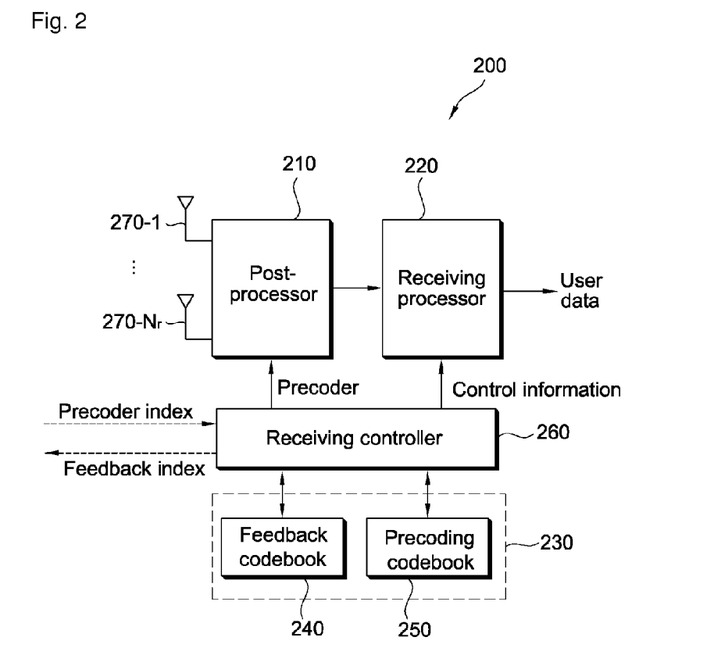
FIG. 2 is a block diagram showing a receiver having multiple antennas in accordance with an embodiment of the present invention.

FIG. 2 is a block diagram showing the receiver in accordance with an embodiment of the present invention.

Referring to FIG. 2, a receiver 200 includes a post-processor 210, a receiving processor 220, a memory unit 230, the feedback codebook 240, the precoding codebook 250, the receiving controller 260, and receiving antennas 270-1, . . . , 270-Nr. The receiver 200 can be a part of a user equipment (UE). The user equipment can be fixed or mobile and can also be referred to as another terminology, such as a mobile station (MS), a user terminal (UT), a subscriber station (SS) or a wireless device. Downlink is communication from a base station to a user equipment and uplink is communication from a user equipment to a base station.

A signal x received from the receiving antennas 270-1, . . . , 270-Nr is input to the post-processor 210. The post-processor 210 performs a post-processing corresponding to the precoding unit 120. The receiving processor 220 demaps an input symbol u, which is the output of the post-processor 210, to coded data and decodes the coded data to thereby restore original data.

The memory unit 230 stores the feedback codebook 240 and the precoding codebook 250. The feedback codebook 240 is identical to the feedback codebook 150 included in the transmitter 100, and the precoding codebook 250 is identical to the precoding codebook 160 included in the transmitter 100.

The receiving controller 260 selects an entity, which will be feedback to the transmitter 100, of a plurality of entities belonging to the feedback codebook 240. The receiving controller 260 generates a feedback index according to the selected entity. The feedback index is information to indicate a specific entity belonging to the feedback codebook 240. The receiving controller 260 feedbacks the feedback index to the transmitter 100. The thus feedback index is called a feedback index. Meanwhile, the receiving controller 260 extracts a precoder according to a precoder index, which is received from the transmitter 100, from the precoding codebook 250. The extracted precoder is sent to the post-processor 210, and the post-processor 210 performs a post processing on the received signal by employing the extracted precoder.

I. Construction of Precoding Unit Employing DPC

A precoding unit can process an input symbol according to the DPC method. In the DPC method, assuming that a signal $u_1$ is sent to a first user and a signal $u_2$ is sent to a second user, a transmitter arbitrarily cancels interference of the signal $u_1$ from the signal $u_2$. Here, a receiver of the second user can receive only the signal $u_2$ as if interference does not exist in the signal $u_2$. According to this method, separate cancellation of interference is not necessary in the receiver, so the complexity of the receiver can be lowered significantly. For detailed DPC, reference can be made to M. Costa, "Writing on Dirty Paper", IEEE Trans. on Inf. Theory, vol. IT-239, No. 3, May 1983. In this document, M. Costa proves that a channel capacity is identical to that of a case where interference does not exist under limited transmission power through DPC.

Figure 3:
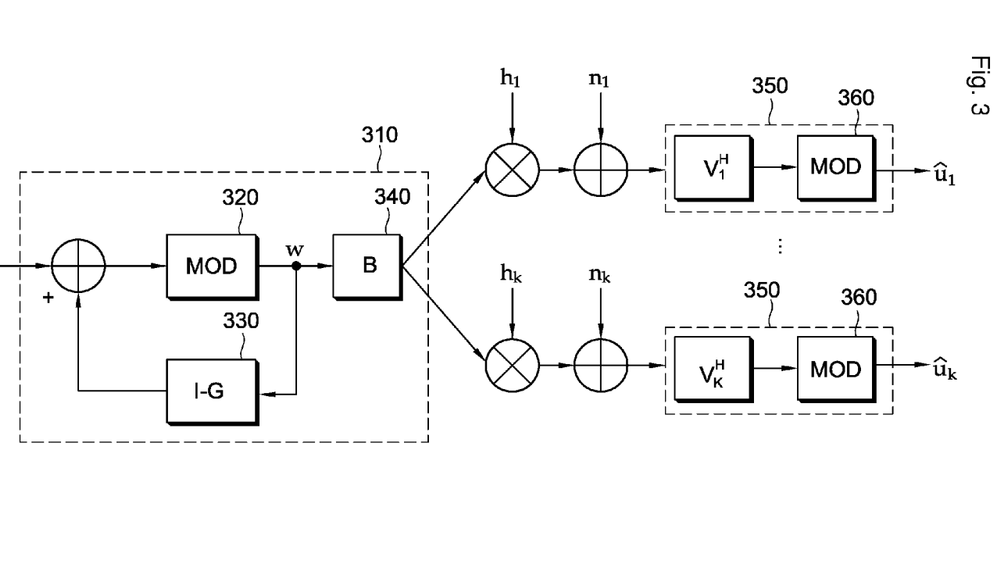
FIG. 3 is an exemplary view in which a communication system, including a precoding unit that performs DPC according to an embodiment of the present invention, is modeled.

FIG. 3 is an exemplary view in which a communication system, including a preceding unit that performs DPC according to an embodiment of the present invention, is modeled.

Referring to FIG. 3, a precoding unit 310 of a transmitter generates a transmission symbol x by performing DPC on an input symbol u. The precoding unit 310 includes a modulo operation unit 320, a feedback unit 330 and a preceding operation unit 340. The modulo operation unit 320 performs a modulo operation, and the feedback unit 330 feedbacks the output of the modulo operation unit 320 to the input of the modulo operation unit 320 in order to cancel interference between multiples users. The precoder operation unit 340 generates the transmission symbol x by multiplying a vector w by a transmit antenna matrix B through the modulo operation, and transmits the generated transmission symbol x through transmission antennas.

A post-processor 350 of a receiver processes a receiving antenna matrix $v_i^H$ with respect to an input signal and sends the processing result to a modulo operation unit 360. $()^H$ refers to a Hermitian matrix. The output of the modulo operation unit 360 becomes an estimation symbol, which is demapped, subject to channel decoding, and then restored to original data.

Received input symbol vectors $u=\{u_1, \ldots, u_K\}$ include input symbols from a user 1 to a user K. An input symbol $u_i$ of a user i has a constellation size selected by a data rate $Rate_i$ of the user i. $(-L_i, L_i]$ is defined as an interval where a constellation is included. For example, assuming that a constellation size is 16-QAM in the data rate of 4 bits per channel, the coordinate of constellation points is selected from $\{\pm1, \pm3\}$ and becomes $L_i=4$.

A matrix I-G feedback by the feedback unit 330 is an upper triangular matrix. I-G is adapted to arbitrarily cancel interference of multiple users according to a predetermined encoding sequence. It is assumed that an encoding sequence to be described below is an order from a user K to a user 1.

Arbitrarily cancelled values are used to generate the vector w through the modulo operation. The vector w is expressed as MathFigure 1

$$w_i = u_i - \sum_{j=i+1}^{K} g_{ij} w_j \mod(-L_i, L_i] \qquad [\text{Math. 1}]$$

where $w_i$ is an i-th element of the vector w, and $g_{ij}$ is a (i,j)-th element of the matrix G.

The modulo operation is performed so as to save transmission power while maintaining the distinguishability of constellation points. When power of a feedback signal is greater than that of an input symbol, the vector w has uniform distributions within the interval $(-L_i, L_i]$. Assuming that $\sigma_{wi}^2$ is the power of $w_i$, it results in $$\sigma_{wi}^2 = 2L_i^2/3$$

in the uniform distributions. When $i \neq j$, $w_i$ and $w_j$ are uncorrelated due to the modulo operation. It leads to $R_w = E[ww^H] = \text{diag}(\sigma_{w1}^2, \ldots, \sigma_{wK}^2)$.

The transmission signal x=Bw, which has a covariance matrix $E[xx^H] = B R_w B^H$. Here, a transmit covariance matrix with respect to the user i is $\sigma_{wi}^2 b_i b_i^H$. Meanwhile, assuming that $S_i$ is a transmit covariance matrix with respect to a user i, it can be defined as $S_i = \lambda_i m_i m_i^H$. Here, $\lambda_i$ denotes an eigenvalue of $S_i$ and $m_i$ is a unit-norm eigenvector. $\lambda_i$ denotes optimal power assignment to the user i and $m_i$ is a transmit beamforming vector. Thus, the following equation can be obtained.

MathFigure 2

$$b_i = \frac{\sqrt{\lambda_i}}{\sigma_{wi}} m_i \qquad [\text{Math. 2}]$$

where $b_i$ is a vector multiplied by i-th user data in the transmit antenna matrix B.

The feedback matrix G is found below. The feedback matrix G is designed to cancel interference from a previously encoded user. The matrix G can be found through DFE in a receiver. A signal $y_i$ received by the receiver of a user i is expressed as shown MathFigure 3

$$y_i = h_i x + n_i = h_i b_i w_i + h_i \sum_{i \neq j} b_j w_j + n_i \qquad [\text{Math. 3}]$$

where $h_i$ is a Nt×1 channel vector to an i-th receiver from the transmitter and $n_i$ is noise with respect to the i-th receiver.

The types of linear DFE include zero-forcing (ZF) DFE and minimum mean square error (MMSE) DFE.

A matrix G with respect to ZF DFE is first found. Assuming that $$\hat{x}_i$$

is a transmission signal estimated with respect to an i-th user, it can be expressed in the following Equation.

MathFigure 4

$$\hat{x}_i = \frac{y_i}{h_i b_i} = \left( w_i + \frac{h_i \sum_{i \neq j} b_j w_j}{h_i b_i} + \frac{n_i}{h_i b_i} \right)_{\text{modi}} \qquad [\text{Math. 4}]$$

When neglecting noise, the output of ZF DFE with respect to a (K−1)-th user is expressed as shown MathFigure 5

$$\hat{u}_{K-1} = \left( w_{K-1} + \frac{h_{K-1} b_K w_K}{h_{K-1} b_{K-1}} + \frac{h_{K-1} \sum_{j \neq K, K-1} b_j w_j}{h_{K-1} b_{K-1}} \right)_{\text{mod}K-1} \qquad [\text{Math. 5}]$$

$$= \left( u_{K-1} - g_{K-1} u_K \frac{h_{K-1} b_K u_K}{h_{K-1} b_{K-1}} + \frac{h_{K-1} \sum_{j \neq K, K-1} b_j w_j}{h_{K-1} b_{K-1}} \right)_{\text{mod}K-1}$$

where $\alpha_1$ and $\alpha_2$ are specific constants. If it is sought to cancel the interference of a K-th user from the (K−1)-th user, who is a next user, it must be $$g_{K-1K} = \frac{h_{K-1}b_K}{h_{K-1}b_{K-1}}.$$

If the equation is expanded in this manner, $g_{ij}$, that is, a (i,j)-th element of the matrix G can be expressed in the following equation.

MathFigure 6

$$g_{ij} = \frac{h_i b_j}{h_i b_i} \quad \text{[Math. 6]}$$

In MMSE DFE, arbitrary cancellation of partial interference is carried out. In this case, $g_{ij}$, that is, a (i,j)-th element of the matrix G can be expressed as shown MathFigure 7

$$g_{ij} = \beta_i \frac{h_i b_j}{h_i b_i} \quad \text{[Math. 7]}$$

where $\beta_i$ can be selected as in the following equation

MathFigure 8

$$\beta_i = \frac{\sigma_{wi}^2 |h_i b_i|^2}{1 + \sum_{j=1}^{i} \sigma_{wj}^2 |h_i b_j|^2} \quad \text{[Math. 8]}$$

In an embodiment in which DPC is performed, DPC can be carried out by applying a singular value decomposition (SVD). SVD can be carried out to decompose a specific matrix H into unitary matrices U and V and a diagonal matrix $\Lambda$ as in the following Equation.

MathFigure 9

$$H = U \Lambda V^H \quad \text{[Math. 9]}$$

Here, assuming that H is channel information known to both the transmitter and the receiver, a weight matrix is processed on a transmission signal in the transmitter, and the receiver can extend a channel capacity through a proper signal process.

The transmit signal is x=Bw, and a covariance matrix $E[xx^H]=B R_w B^H$ can be generated by employing x. Here, $R_w = E[ww^H] = \text{diag}(\sigma_{w1}^2, \ldots, \sigma_{wK}^2)$, which becomes a diagonal matrix. If the Equation 8 is made to correspond to the covariance matrix $E[xx_H]$, the unitary matrices U and V of the Equation 8 correspond to the transmit antenna matrix B and the diagonal matrix $\Lambda$ of the Equation 8 correspond to $R_w$.

A transmit covariance matrix with respect to a user i is $\sigma_{wi}^2 b_i b_i^H$. Meanwhile, assuming that $S_i$ is a transmit covariance matrix with respect to a user i, it can be defined as $S_i = \lambda_i m_i m_i^H$. Here, $\lambda_i$ is the eigenvalue of $S_i$ and $m_i$ is the unit-norm eigenvector. $\lambda_i$ is optimal power assignment to the user i and $m_i$ the transmit beamforming vector. Thus, the following equation can be obtained.

MathFigure 10

$$b_i = \frac{\sqrt{\lambda_i}}{\sigma_{wi}} m_i \quad \text{[Math. 10]}$$

where $b_i$ is a vector, which is multiplied by i-th user data, in the transmit antenna matrix B.

In another embodiment where DPC is performed, DPC can be performed by applying QR decomposition. In order to find the vector $b_i$ multiplied by i-th user data in the transmit antenna matrix B, QR decomposition can be used. The transmitter gathers channel information from K receivers and generates a stack matrix $H_s$ such as the following equation:

MathFigure 11

$$H_s = \begin{bmatrix} \tilde{h}_1 \\ \vdots \\ \tilde{h}_i \\ \vdots \\ \tilde{h}_K \end{bmatrix} \quad \text{[Math. 11]}$$

where $\tilde{h}_i$ is the channel vector with respect to an i-th receiver, and the stack matrix $H_s$ is a matrix, which is generated by stacking the channel vector $\tilde{h}_i$ of the K receivers. The Hermitian matrix $H_s^H$ of the stack matrix $H_s$ can be separated into a unitary matrix Q and an upper triangular matrix R through QR decomposition, as shown in the following equation.

MathFigure 12

$$H_s^H = Q \cdot R \quad \text{[Math. 12]}$$

Thus, the stack matrix is expressed in $H_s = R^H Q^H$. If the transmit antenna matrix B is substituted into the unitary matrix Q, it results in the following equation.

MathFigure 13

$$H_s \cdot B = R^H \quad \text{[Math. 13]}$$

Thus, after the transmit antenna matrix B is processed on the stack matrix $H_s$, the lower triangular matrix $R^H$ can be obtained. Since interference of a user, which is first encoded by the pre-processor, is cancelled, each user becomes a state with no interference from other users.

The vector $b_i$ multiplied by the data of the user i can be found from the transmit antenna matrix B according to the following Equation:

MathFigure 14

$$b_i = \frac{\sqrt{P_i}}{\sigma_{wi}} q_i \quad \text{[Math. 14]}$$

where each $P_i$ is transmission power with respect to the receiver of the user i, and $q_i$ is an i-th column vector of the unitary matrix Q.

The preceding unit can perform precoding by employing a variety of methods other than the method employing the DPC.

II. Construction of Codebook

When the number of entities constituting a codebook is $N_E$, the number of bits necessary to represent the entire indices of the entities is ceil($\log_2 N_E$). The size of a codebook is decided depending on the number of entities belonging to the codebook.

If a transmitter and a receiver use only one codebook, when the size of the codebook is increased, significant overhead is caused when the receiver feedbacks an index to the transmitter. This is because the entire precoders depending on various spatial correlations must be taken into consideration in channel environments having the various spatial correlation and, therefore, the number of the precoders is increased exponentially. In this circumstance, if the transmitter and the receiver exchange an index of a codebook constructed of the same precoder, performance may be degraded due to overhead depending on excessive feedback information.

Thus, it is efficient for a transmitter and a receiver to use two separate codebooks. That is, one codebook is a codebook for allowing the transmitter to feed forward the codebook to the receiver (hereinafter, referred to as a "preceding codebook"), and the other codebook is a codebook for allowing the receiver to feed forward the codebook to the transmitter (hereinafter, referred to as a "feedback codebook"). In order to reduce feedback overhead, it is preferred that the size of the feedback codebook is smaller than that of the precoding codebook. For example, when the number of precoders belonging to a precoding codebook, the number of bits to be used as a precoder index is 6 bits. Here, when the number of entities belonging to a feedback codebook is limited to eight so as to reduce the amount of feedback information feedback from the receiver to the transmitter, the number of bits to be used as a feedback index is 3 bits.

In an embodiment, each entity $E_n$ ($1 \leq n \leq N_F$) of a codebook can be generated by the following equation:

MathFigure 15

$$E_n = \frac{1}{\sqrt{N_T}} e^{j 2\pi (m-1)(n-1)/N} \qquad \text{[Math. 15]}$$

where $N_T$ is the number of transmission antennas, N s the number of entities belonging to a codebook, m ($1 \leq m \leq N_T$) s a row number of the entity, and n is a feedback index. The entity generated by the Equation 15 becomes a vector. The codebook may be a set of channel vectors in which various pieces of available channel state information are quantized in addition to the Equation 15. The codebook can be applied to both a precoding codebook and a feedback codebook.

In another embodiment, a codebook can be generated by a Grassmannian line packing scheme. For a codebook by the scheme, reference can be made to Love D. J., Robert W. Heath Jr., Thomas Strohmer, "Grassmannian beamforming for multiple-input multiple-output wireless systems" Information theory, IEEE transaction on, vol. 49, issue 10, October 2003, pp. 2735-2747. An example of a codebook generated by employing the Grassmannian line packing scheme is as follows. When the number Nt of transmission antennas is 2 and the size N of a codebook is 8, a codebook is expressed in the following Equation 16.

MathFigure 16

$$\left[ \begin{pmatrix} 0.8393 - 0.2939i \\ -0.1677 + 0.4256i \end{pmatrix}, \begin{pmatrix} -0.3427 + 0.9161i \\ 0.0498 + 0.2019i \end{pmatrix}, \right. \\ \begin{pmatrix} -0.2065 + 0.3371i \\ 0.9166 + 0.0600i \end{pmatrix}, \begin{pmatrix} 0.3478 - 0.3351i \\ 0.2584 + 0.8366i \end{pmatrix}, \\ \begin{pmatrix} 0.1049 + 0.6820i \\ 0.6537 + 0.3106i \end{pmatrix}, \begin{pmatrix} 0.0347 - 0.2716i \\ 0.0935 - 0.9572i \end{pmatrix}, \\ \left. \begin{pmatrix} -0.7457 + 0.1181i \\ -0.4553 - 0.4719i \end{pmatrix}, \begin{pmatrix} -0.7938 + 0.3232i \\ 0.5000 + 0.0906i \end{pmatrix} \right] \qquad \text{[Math. 16]}$$

In still another embodiment, a preceding codebook can also be generated by employing a zero forcing-beamforming (ZF-BF) scheme. This scheme is used to generate a preceding codebook by employing the entire possible sets of entities (matrices or vectors), which belong to a feedback codebook.

It is assumed that that there exist k users. Assuming that entities according to feedback indices feedback from respective users are $V_1$, $V_2$, . . . , $V_k$, respectively, a precoding codebook is generated by the following Equation 17.

MathFigure 17

$$B = \text{Norm}[C^H (CC^H)^{-1}] \qquad \text{[Math. 17]}$$

$$C = \begin{bmatrix} V_1 \\ V_2 \\ \vdots \\ V_K \end{bmatrix}$$

where C is the matrix obtained from each entity and $C^H$ is the Hermitian matrix of C. Norm[a] is a normalized matrix of a matrix a. The precoding codebook becomes a set of precoders, which are generated by reflecting all possible sets of the entire entities belonging to a feedback codebook.

In still another embodiment, a precoding codebook may also be generated by employing the QR decomposition scheme. First, a receiver selects any one entity from a feedback codebook and sends a feedback index corresponding to a selected entity to a transmitter. The transmitter extracts the entity according to the feedback index from the feedback codebook. When entities obtained from K receivers are $V_1$, $V_2$, . . . , $V_K$, respectively, the transmitter generates the following stack matrix C.

MathFigure 18

$$C = \begin{bmatrix} V_1 \\ V_2 \\ \vdots \\ V_i \\ \vdots \\ V_K \end{bmatrix} \qquad \text{[Math. 18]}$$

$V_i$ is an entity obtained from a receiver i. The Hermitian matrix of the stack matrix C can be separated into an unitary matrix Q and an upper triangular matrix R through QR decomposition as shown in the following equation.

MathFigure 19

$$C^H = QR \quad \text{[Math. 19]}$$

Thus, the stack matrix C is represented by $C = R^H Q^H$. If any one precoder B selected from the precoding codebook is substituted into the unitary matrix Q, it results in the following Equation.

MathFigure 20

$$CB = R^H \quad \text{[Math. 20]}$$

Thus, after the precoder B is processed on the stack matrix C, the lower triangular matrix $R^H$ can be obtained. The precoding codebook become a set of precoders, which are generated by reflecting all possible sets of the entire entities belonging to a feedback codebook.

III. Method of Selecting Precoder

A transmitter selects a proper precoder from a precoding codebook by employing a plurality of entities. A method of allowing the transmitter to select a precoder is as follows. It is assumed that a plurality of feedback entities is $V_1, V_2, \ldots, V_k$ and an i-th precoder belonging to a precoding codebook is $B_i$.

In an embodiment, a transmitter can select a precoder by employing a data transmission performance metric F. The data transmission performance metric F is a metric using received entities and precoders as parameters and is expressed in the following Equation.

MathFigure 21

$$\max [F(V_1, V_2, \ldots, V_K, B_i)] \quad \text{[Math. 21]}$$

The transmitter calculates the metric with respect to the entire precoders belonging to a precoding codebook. The transmitter selects a precoder $B_i$ in which the metric F is a maximum from the entire precoders. The transmitter sends the selected precoder $B_i$ to the precoding unit.

In another embodiment, a transmitter can select a precoder by employing a data transmission error metric G. The data transmission error metric G is a metric using received entities and precoders as parameters and is expressed in the following equation.

MathFigure 22

$$\min[G(V_1, V_2, \ldots, V_K, B_i)] \quad \text{[Math. 22]}$$

The transmitter calculates the metric with respect to the entire precoders belonging to a precoding codebook. The transmitter selects a precoder Bi in which the metric G is a minimum from the entire precoders. The transmitter sends the selected precoder Bi to the precoding unit.

IV. Method of Transmitting Selected Precoder

A method of transmitting a precoder selected by a transmitter is disclosed. If a transmitter transmits a precoder itself, overhead is increased. Thus, the transmitter can transmit only an index to a receiver in order to inform a precoder used for data transmission. First, a method of allowing a transmitter to receive a feedback index from a receiver and to select a precoder is described simply.

In a feedback codebook $G_i = \{G_0, G_1, \ldots, G_i\}$ comprised of vector entities, the rank of each $G_i$ is the same as a rank that will be sent by a transmitter. A receiver finds an optimal vector from Gi and feedbacks a feedback index thereof to the transmitter. Alternatively, a receiver can feedback an index of an optimal vector $G_{ij}$ (a j-th column of an i-th matrix), which is found from a feedback codebook comprised of a set of matrices, to a transmitter. Alternatively, a channel is quantized and an optimal vector is feedback from a feedback codebook comprised of a set of predetermined matrices.

A transmitter receives a feedback index from a receiver and finds a precoder P. Here, a method of finding the precoder P may be known to both the transmitter and the receiver. The precoder P is composed of a number of vectors Pi. That is, $P = [P_1\ P_2\ P_3, \ldots, P_l]$. $P_i$ is a vector multiplied by data transmitted to each user. The transmitter can transmit the obtained precoder to a receiver in the form of an index.

As an example to inform a precoder, a transmitter can directly transmit a precoder index, which indicates a specific precoder in a precoder codebook, that is, a set of precoders, to a receiver.

Figure 4:
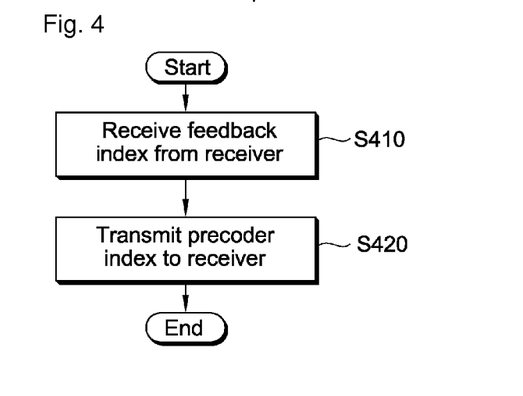
FIG. 4 is a flowchart illustrating a method of transmitting a precoder in accordance with an embodiment of the present invention.

FIG. 4 is a flowchart illustrating a method of transmitting a precoder in accordance with an embodiment of the present invention. FIG. 4 illustrates a method of informing a receiver of a precoder by directly transmitting an index of a precoder, which will be used to transmit the index by a transmitter. The method employs an index, which is able to represent a set of the entire precoders that can be generated, and is therefore referred to as full indexing.

Referring to FIG. 4, a transmitter receives a feedback index from a receiver (S410). The receiver feedbacks a feedback index according to an entity, which is selected from a feedback codebook, to the transmitter. The receiver can transmits the feedback index by employing an uplink control channel or the like.

The transmitter transmits a precoder index to the receiver (S420). The transmitter selects any one specific precoder from a precoding codebook, generates a precoder index according to a selected precoder, and transmits it to a receiver.

Here, as an example in which the transmitter transmits the precoder index, the transmitter can transmit the precoder index by employing a downlink control channel. As another example, the transmitter can transmit the precoder index in a dedicated pilot to the receiver. The dedicated pilot is a pilot, which is used when a transmitter transmits a precoder so that a receiver can directly obtain an equivalent channel. Assuming that a precoder and a channel are W and H, respectively, and a transmit signal and a receive signal are x and y, respectively, when a transmitter transmits a dedicated pilot, a receiver receives y=HWx. The receiver can restore a signal by employing HW obtained from the dedicated pilot in order to decode x.

As another example to inform a precoder, a transmitter equipped with multiple antennas can transmit an interference index, that is, an index regarding the entity (a vector or a matrix) of another user, which acts as interference within a precoder to be transmitted. For example, the transmitter finds a precoder by employing not only an entity (a vector or a matrix) preferred by a first user, but also an entity (a vector or a matrix) preferred by a second user. Here, a feedback entity (a feedback vector or a feedback matrix) transmitted by the second user acts on the first user as interference. This is called an interference entity (an interference vector or an interference matrix). In contrast, a feedback entity (a feedback vector or a feedback matrix) transmitted by the first user acts on the second user as interference. Thus, the transmitter transmits an interference index, informing the feedback vector of the second user, to the first user and an interference index, informing the feedback vector of the first user, to the second user.

Hereinafter, a method of transmitting an interference index in a system employing a per user unitary and rate control (PU2RC) scheme and a zeroforcing-beamforming (ZF-BF) scheme.

The PU2RC scheme is a precoding-based multiple user-MIMO (MU-MIMO) cheme and can increase an overall throughput of a system since it can obtain a multi-user diversity in the spatial domain.

Figure 5:
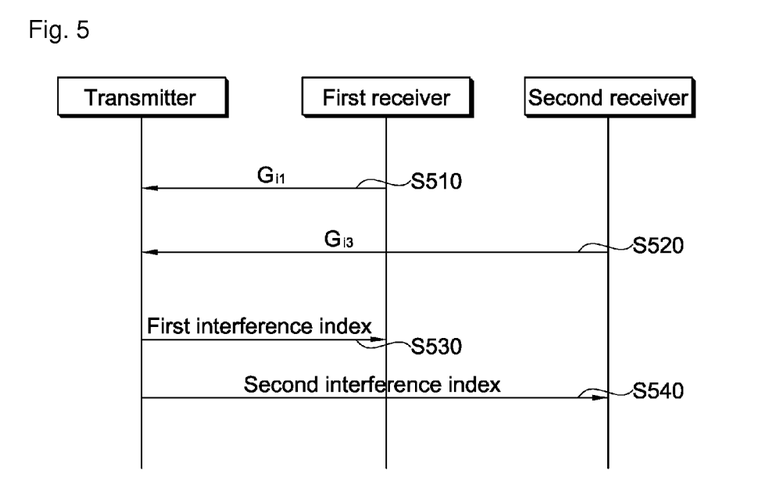
FIG. 5 is a flowchart illustrating a method of transmitting a precoder in accordance with another embodiment of the present invention.

FIG. 5 is a flowchart illustrating a method of transmitting a precoder in accordance with another embodiment of the present invention. FIG. 5 illustrates a case where a transmitter including four antennas transmits data to a rank 2 according to the PU2RC scheme. The rank refers to the number of independent data transmitted from a transmitter to a receiver.

Referring to FIG. 5, a transmitter receives a first feedback index to indicate $G_{i1}$, that is, a first feedback entity (hereinafter, referred to as a "feedback vector" for convenience' sake), from a first receiver (S510). $G_i$ is a matrix belonging to a feedback codebook and $G_i=[G_{i0}\ G_{i1}\ G_{i2}\ G_{i3}]$. $G_{i1}$ is a first column vector of the matrix $G_i$ and $G_{i2}$ is a second column vector of the matrix $G_i$.

The transmitter receives a second feedback index to indicate $G_{i3}$, that is, a second feedback vector from a second receiver (S520). $G_{i3}$ is a third column vector of the matrix $G_i$. In other words, the transmitter that has received the index $G_{i1}$ from the first receiver receives the index $G_{i3}$ from the second receiver, which prefers another vector other than $G_{i1}$ in the matrix $G_i$ of the feedback codebook.

The transmitter transmits a first interference index to the first receiver (S530) and a second interference index to the second receiver (S540). The transmitter generates a precoder based on the first and second feedback vectors and transmits data to the first and second receivers by employing the generated precoder. Here, in order to inform the first and second receivers of the precoder that was used by the transmitter, the transmitter can inform the precoder by transmitting an interference index not the index of the precoder.

The transmitter can generate the interference index as follows. The transmitter can generate the interference index through a combination of a vector regarding a feedback index feedback by a receiver at $G_i$, and a vector that generates interference (a vector feedback by another receiver).

Table 1 shows an example of interference indices when the rank is 2. Since the rank is 2, a precoder is generated by one feedback vector and one interference vector.

TABLE 1

| First precoder | | | Second precoder | | |
|---|---|---|---|---|---|
| First feedback vector | Interference vector | First interference index | Second feedback vector | Interference vector | Second interference index |
| $G_{i0}$ | none | 00 | $G_{i3}$ | none | 00 |
| $G_{i0}$ | $G_{i1}$ | 01 | $G_{i3}$ | $G_{i0}$ | 01 |
| $G_{i0}$ | $G_{i2}$ | 10 | $G_{i3}$ | $G_{i1}$ | 10 |
| $G_{i0}$ | $G_{i3}$ | 11 | $G_{i3}$ | $G_{i2}$ | 11 |

Referring to Table 1, the first interference index 00 indicates that there is no interference vector, with respect to the first receiver that has feedbacked the first feedback vector. The first interference index 01 indicates that the interference vector is $G_{i1}$, with respect to the first feedback vector $G_{i0}$ that has been feedbacked by the first receiver. The first interference index 10 indicates that the interference vector with respect to the first receiver is $G_{i2}$, and the first interference index 11 indicates that the interference vector with respect to the first receiver is $G_{i3}$.

In a similar way, the second interference index 00 indicates that there is no interference vector, with respect to the second receiver that has feedbacked the second feedback vector. The second interference index 01 indicates that the interference vector is $G_{i0}$, with respect to the second feedback vector $G_{i3}$ that has been feedbacked by the second receiver. The second interference index 10 indicates that the interference vector with respect to the second receiver is $G_{i1}$, and the second interference index 11 indicates that the interference vector with respect to the second receiver is $G_{i2}$.

The transmitter has received the feedback vectors $G_{i0}$ and $G_{i3}$, which belong to respective $G_i$, from the first and second receivers, respectively. However, the second feedback vector $G_{i3}$ that has been feedbacked by the second receiver acts on the first receiver as an interference vector. Hence, the transmitter transmits the first interference index 11 to the first receiver. On the other hand, the second receiver has feedbacked $G_{i3}$ to the feedback vector. Thus, the feedback vector $G_{i0}$ that has been feedbacked by the first receiver acts on the second receiver as an interference vector. Accordingly, the transmitter transmits the second interference index 01 to the second receiver.

The first receiver that has received the first interference index 11 can know that a transmitter has transmitted data by employing the first precoders $[G_{i0}G_{i3}]$. Further, the first receiver can know that a feedback vector feedbacked by the second receiver (it is an interference vector from the viewpoint of the first receiver) is $G_{i3}$ other than $G_{i0}$, that is, the feedback vector that has been feedbacked by itself from the first precoder.

The second receiver that has received the second interference index 01 can know that a transmitter has transmitted data by employing the second precoders $[G_{i0}G_{i3}]$. Further, the second receiver can know that a feedback vector feedbacked by the first receiver (it is an interference vector from the viewpoint of the second receiver) is $G_{i0}$ other than $G_{i3}$, that is, the feedback vector that has been feedbacked by itself from the second precoder.

In other words, the transmitter selects any one specific precoder from a precoding codebook and transmits an interference index to the receiver in order to inform the receiver of the precoder. The transmitter pairs receivers that have feedbacked only feedback vectors within the same matrix $G_i$, which belong to the same feedback codebook, and schedules the paired receivers, but does not transmit information about each feedback codebook to each receiver. Accordingly, the amount of data consumed to transmit precoders can be reduced unlike full indexing in which an index with respect to a precoder itself is transmitted. The method of transmitting an interference index employs an index, indicating a combination of limited precoders, and is therefore called limited indexing distinctly from full indexing.

The method of mapping the interference index of Table 1 to the combination of the feedback vector and the interference vector is only illustrative, and the interference index need not to be necessarily mapped to 2 bits. Any other methods that are able to represent the interference index may also be used. Further, in Table 1, the interference indices transmitted when there is no interference vector can also be used as indices, which can perform other functions as well as the function of informing that there is no interference.

Table 2 shows an example of interference indices when the rank is 3. Since the rank is 3, a precoder is generated using one feedback vector and two interference vectors.

TABLE 2

| First precoder | | | | Second precoder | | | |
|---|---|---|---|---|---|---|---|
| First feedback vector | Interference vector | Interference vector | First Interference index | Second feedback vector | Interference vector | Interference vector | Second interference index |
| $G_{i1}$ | none | none | 00 | $G_{i2}$ | none | none | 00 |
| $G_{i1}$ | $G_{i0}$ | $G_{i2}$ | 01 | $G_{i2}$ | $G_{i0}$ | $G_{i1}$ | 01 |
| $G_{i1}$ | $G_{i0}$ | $G_{i3}$ | 10 | $G_{i2}$ | $G_{i0}$ | $G_{i3}$ | 10 |
| $G_{i1}$ | $G_{i2}$ | $G_{i3}$ | 11 | $G_{i2}$ | $G_{i1}$ | $G_{i3}$ | 11 |

Referring to Table 2, in the case where a receiver feedbacks the first feedback vector $G_{i1}$, when the interference vectors are $G_{i0}$ and $G_{i2}$, a transmitter transmits the interference index 01. In the case where a receiver feedbacks the second feedback vector $G_{i2}$, when the interference vectors are $G_{i1}$ and $G_{i3}$, a transmitter transmits the interference index 11. In a similar way, the interference indices can be generated in the same manner with respect to the third feedback vector $G_{i0}$ and the fourth feedback vector $G_{i3}$. As described above, if a transmitter transmits an interference index on the basis of an interference vector instead of transmitting an index regarding a precoder itself, a precoder can be known using only 2 bits.

The method of mapping the interference index of Table 2 to the combination of the feedback vector and the interference vector is only illustrative, and the interference index need not to be necessarily mapped to 2 bits. Any other methods that are able to represent the interference index may also be used. Further, in Table 2, the interference indices transmitted when there is no interference vector can also be used as indices, which can perform other functions as well as the function of informing that there is no interference.

Figure 6:
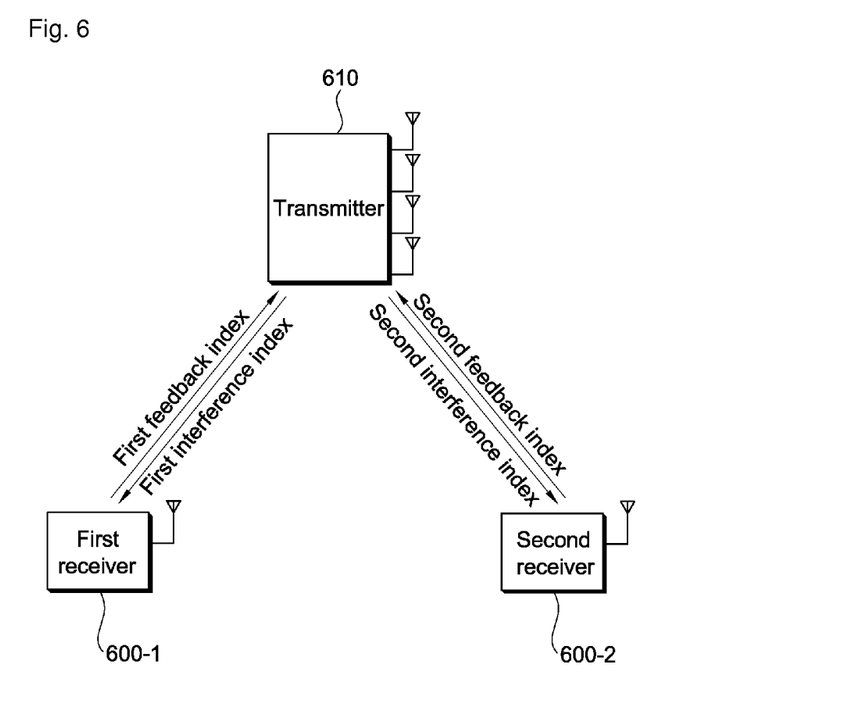
FIG. 6 is a flowchart illustrating a method of transmitting a precoder in accordance with still another embodiment of the present invention.

FIG. 6 is a flowchart illustrating a method of transmitting a precoder in accordance with still another embodiment of the present invention. FIG. 6 shows a case where a transmitter including four antennas transmits data according to the ZF-BF scheme. Here, the transmitter may be a base station and a receiver may be a user equipment (a user). It is assumed that a rank is 2.

Referring to FIG. 6, a first receiver 600-1 and a second receiver 600-2 transmit feedback indices, which are respectively concerned with optimal feedback vectors in a feedback codebook, to a transmitter 610. Here, it is assumed that the feedback codebook V={$V_0$, $V_1$, $V_2$, $V_3$, $V_4$, $V_5$, $V_6$, $V_7$}, the feedback codebook has a size of 3 bits, the first receiver 600-1 feedbacks the feedback vector $V_1$, and the second receiver 600-2 feedbacks the feedback vector $V_5$.

The transmitter 610 generates a precoder [$V_1$ $V_5$] according to the ZF-BF scheme and transmits data to the first and second receivers by employing the generated precoder. Here, if full indexing is used, the number of precoders that can be represented by each vector of the feedback codebook is 56 kinds. That is, a number when two of the eight vectors can be selected sequentially can be calculated according to permutation and is $P^8_2=8!/(8-2)!=56$.

If full indexing is employed, 56 kinds of precoders must be included and, therefore, a precoder index of at least 6 bits in size is required. On the other hand, if limited indexing is employed, the transmitter 610 can inform the first and second receivers 600-1, 600-2 of a precoder with only 3 bits because an interference index is transmitted. In other words, the first and second receivers 600-1, 600-2 know the indices of feedback vectors that have been transmitted by themselves and therefore can generate interference indices according to interference vectors of Table 3. Table 3 shows an example of interference indices transmitted to the first receiver.

TABLE 3

| precoder | | | precoder | | |
|---|---|---|---|---|---|
| feedback vector | Interference vector | interference index | feedback vector | Interference vector | interference index |
| $V_1$ | none | 000 | $V_1$ | $V_4$ | 100 |
| $V_1$ | $V_0$ | 001 | $V_1$ | $V_5$ | 101 |
| $V_1$ | $V_2$ | 010 | $V_1$ | $V_6$ | 110 |
| $V_1$ | $V_3$ | 011 | $V_1$ | $V_7$ | 111 |

Referring to Table 3, the interference index transmitted to the first receiver 600-1 is 101 in which [the feedback vector the interference vector] correspond to [$V_1$ $V_5$]. If the first receiver 600-1 that selects $V_1$ as a feedback vector is informed of an interference index of 3 bits, the first receiver 600-1 can know a precoder by employing the feedback index transmitted by itself and an interference index received from the transmitter 610.

Even when an interference vector constituting a precoding codebook is limited, the size of a precoder index can be reduced in the same manner. For example, it is assumed that when $V_0$ is selected as a feedback vector, an interference vector is limited to at least any one of $V_3$, $V_4$, and $V_5$.

Here, if full indexing (that is, when a precoder index is used) is employed, possible combinations of the precoders are [$V_0$, $V_3$], [$V_0$, $V_4$], [$V_0$, $V_5$], [$V_1$, $V_4$], [$V_1$, $V_5$], [$V_1$, $V_6$], [$V_1$, $V_5$], [$V_2$, $V_5$], [$V_2$, $V_6$], [$V_2$, $V_7$], [$V_3$, $V_6$], [$V_3$, $V_7$], and [$V_4$, $V_7$]. Since a possible number of the combinations is 13, a total number of bits to be used in the precoder index is 4.

On the other hand, if limited indexing is employed (that is, when an interference index is used), possible combinations of the precoders are [$V_0$ $V_3$], [$V_0$ $V_4$], and [$V_0$ $V_5$]. Thus, the transmitter 610 can let the precoders sufficiently known using 2 bits. Since one index is not used, only one feedback vector can represent a case where the precoders are constituted ([$V_1$]).

Hereinafter, the number of bits used in full indexing and the number of bits used in limited indexing are compared and described. It is assumed that a feedback codebook is V={$V_0$, $V_1$, $V_2$, $V_3$, $V_4$, $V_5$} for convenience's sake. That is, V is a feedback codebook having six feedback vectors. Table 4 illustrates the number of transmission antennas, and a bit number of an index used in each of full indexing and limited indexing according to the number of ranks.

TABLE 4

| Number of antenna | Rank | Full indexing | Limited indexing |
|---|---|---|---|
| 2 | 2 | Ceil(Num_alloc_Subband × Log$_2$(30)) | Ceil(Num_alloc_Subband × Log$_2$(5)) |
| 4 |  | Ceil(Num_alloc_Subband × Log$_2$(240)) | Ceil(Num_alloc_Subband × Log$_2$(15)) |
|  | 3 | Ceil(Num_alloc_Subband × Log$_2$(3360)) | Ceil(Num_alloc_Subband × Log$_2$(105)) |
|  | 4 | Ceil(Num_alloc_Subband × Log$_2$(436800)) | Ceil(Num_alloc_Subband × Log$_2$(455)) |

Referring to Table 4, Ceil(A) denotes a minimum integer greater than A, and Num_alloc_Subband denotes the number of sub-bands assigned for data transmission. In a method of informing each sub-band of a precoder by employing full indexing, the number of necessary bits is as follows. For example, when the number of transmission antennas is 2 and the rank is 2, the number of precoders that can be generated can be $P^6_2=6!/(6-2)!=30$.

Further, in the case where a precoder is transmitted to other receivers, which are paired per one sub-band basis, Ceil(log$_2$(30$^{Num\_alloc\_Subband}$)) bits are necessary. If it is sought to fix the bit number, Ceil(log$_2$(30$^{Num\_alloc\_Subband}$)) bits are necessary.

In a method of informing each sub-band of a precoder by employing limited indexing, the number of necessary bits is as follows. For example, when the number of transmission antennas is 2 and the rank is 2, interference indices can be decided as in the following Table 5.

TABLE 5

| Feedback vector | Precoder including interference vector | Index left |
|---|---|---|
| V$_0$ | [V$_0$ V$_1$], [V$_0$ V$_2$], [V$_0$ V$_3$], [V$_0$ V$_4$], [V$_0$ V$_5$] | 3 index left |
| V$_1$ | [V$_0$ V$_1$], [V$_1$ V$_2$], [V$_1$ V$_3$], [V$_1$ V$_4$], [V$_1$ V$_5$] | 3 index left |
| V$_2$ | [V$_0$ V$_2$], [V$_1$ V$_2$], [V$_2$ V$_3$], [V$_2$ V$_4$], [V$_2$ V$_5$] | 3 index left |
| V$_3$ | [V$_0$ V$_3$], [V$_1$ V$_3$], [V$_2$ V$_3$], [V$_3$ V$_4$], [V$_3$ V$_5$] | 3 index left |
| V$_4$ | [V$_0$ V$_4$], [V$_1$ V$_4$], [V$_2$ V$_4$], [V$_3$ V$_4$], [V$_4$ V$_5$] | 3 index left |
| V$_5$ | [V$_0$ V$_1$], [V$_1$ V$_3$], [V$_2$ V$_3$], [V$_3$ V$_4$], [V$_3$ V$_5$] | 3 index left |

Referring to Table 5, when the feedback vector is V$_0$, the interference vector may become any one of V$_1$, V$_2$, V$_3$, V$_4$ and V$_5$. The number of precoders comprised of possible combinations of the feedback vectors and the interference vectors is $C^5_1=5!/(5-1)!=5$. In the case where different receivers are paired per on a sub-band basis, a bit number used for an interference index is Ceil(log$_2$(5$^{Num\_alloc\_Subband}$)). If it sought to fix the bit number, Ceil(log$_2$(5$^{Num\_alloc\_Subband}$)) bits are necessary. Thus, five interference indices are necessary, and three indices are left when five interference indices are represented using 3 bits. The three left indices can be used to represent a precoder with no interference.

Figure 7:
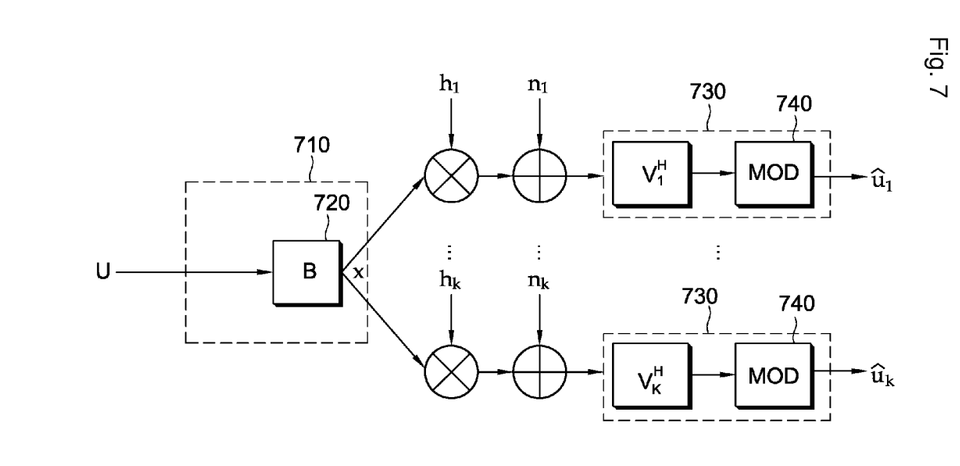
FIG. 7 is a block diagram showing a communication system that performs precoding in accordance with an embodiment of the present invention.

FIG. 7 is a block diagram showing a communication system that performs precoding in accordance with an embodiment of the present invention.

Referring to FIG. 7, a precoding unit 720 of a transmitter 710 generates a transmission symbol x by performing preceding on an input symbol u. A post-processor 730 of a receiver performs a receiving antenna matrix v$_i^H$ on a received signal and sends the result to a modulo operation unit 740. The output of the modulo operation unit 740 becomes an estimation symbol, which is demapped, subject to channel decoding and then restored to original data.

An input symbol vector u={u$_1$, . . . , u$_K$} includes input symbols from a user 1 to a user K. The input symbol u$_i$ of the user i has a constellation size selected by a data rate Rate$_i$ of the user i. (−L$_i$, L$_i$] is defined as an interval including a constellation. For example, assuming that a constellation size is 16-QAM in the data rate of 4 bits per channel, the coordinate of constellation points is selected from {±1, ±3} and thus becomes L$_i$=4.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting a codebook index in a wireless communication system, the method comprising:
   receiving a first feedback index from a first receiver, the first feedback index indicating a first vector selected from a plurality of vectors belonging to a feedback codebook;
   receiving a second feedback index from a second receiver, the second feedback index indicating a second vector selected from the plurality of vectors belonging to the feedback codebook;
   selecting a precoding matrix from a precoding codebook using the first feedback index and the second feedback index, the precoding codebook comprising a plurality of precoding matrices;
   transmitting a first interference index informing the precoding matrix to the first receiver;
   transmitting a second interference index informing the precodig matrix to the second receiver; and
   transmitting data precoded using the precoding matrix to the first receiver and the second receiver,
   wherein the first interference index indicates the precoding matrix among a first sub-precoding codebook, the first sub-precoding codebook being a subset of the precoding codebook and including precoding matrices which comprise the first vector, and
   the second interference index indicates the precoding matrix among a second sub-precoding codebook, the second sub-precoding codebook being a subset of the precoding codebook and including precoding matrices which comprise the second vector.

2. The method of claim 1, wherein a size of the precoding codebook is larger than that of the feedback codebook.

3. The method of claim 1, wherein the first vector acts on the second receiver as interference and the second vector acts on the first receiver as interference.

4. The method of claim 1, wherein the feedback codebook is a subset of the precoding codebook.

5. An apparatus of transmitting a codebook index in a wireless communication system, the apparatus comprising:
- a transmission processor for generating a plurality of streams;
- a precoding unit for precoding on the plurality of steams;
- a transmission antennas for transmitting and receiving a radio signal;
- a memory unit for storing a feedback codebook and a precoding codebook; and
- a transmission controller coupled to the transmission processor, the precoding unit, and the memory unit, and configured for:
- receiving a first feedback index from a first receiver, the first feedback index indicating a first vector selected from a plurality of vectors belonging to a feedback codebook;
- receiving a second feedback index from a second receiver, the second feedback index indicating a second vector selected from the plurality of vectors belonging to the feedback codebook;
- selecting a precoding matrix from a precoding codebook using the first feedback index and the second feedback index, the precoding codebook comprising a plurality of precoding matrices;
- transmitting a first interference index informing the precoding matrix to the first receiver;
- transmitting a second interference index informing the precoding matrix to the second receiver; and
- transmitting data precoded using the precoding matrix to the first receiver and the second receiver,
- wherein the first interference index indicates the precoding matrix among a first sub-precoding codebook, the first sub-precoding codebook being a subset of the precoding codebook and including precoding matrices which comprise the first vector, and
- the second interference index indicates the precoding matrix among a second sub-precoding codebook, the second sub-precoding codebook being a subset of the precoding codebook and including precoding matrices which comprise the second vector.

6. The apparatus of claim 5, wherein a size of the precoding codebook is larger than that of the feedback codebook.

7. The apparatus of claim 5, wherein the first vector acts on the second receiver as interference and the second vector acts on the first receiver as interference.

8. The apparatus of claim 5, wherein the feedback codebook is a subset of the precoding codebook.

* * * * *